(12) United States Patent
Horvitz et al.

(10) Patent No.: US 7,120,865 B1
(45) Date of Patent: Oct. 10, 2006

(54) METHODS FOR DISPLAY, NOTIFICATION, AND INTERACTION WITH PRIORITIZED MESSAGES

(75) Inventors: Eric Horvitz, Kirkland, WA (US); Andrew W. Jacobs, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 275 days.

(21) Appl. No.: 09/364,522

(22) Filed: Jul. 30, 1999

(51) Int. Cl.
G06F 15/00 (2006.01)

(52) U.S. Cl. .................. 715/514; 709/207; 709/240
(58) Field of Classification Search ................ 707/514, 707/7; 709/207, 240, 103
See application file for complete search history.

(56) References Cited

U.S. PATENT DOCUMENTS

| | | | | |
|---|---|---|---|---|
| 5,077,668 | A | * | 12/1991 | Doi ............................ 715/531 |
| 5,377,354 | A | * | 12/1994 | Scannell et al. ............ 718/103 |
| 5,694,616 | A | * | 12/1997 | Johnson et al. ............. 709/207 |
| 5,864,848 | A | | 1/1999 | Horvitz et al. |
| 5,974,465 | A | * | 10/1999 | Wong ........................ 709/234 |
| 6,021,403 | A | | 2/2000 | Horvitz et al. |
| 6,182,059 | B1 | * | 1/2001 | Angotti et al. ................ 706/45 |
| 6,185,603 | B1 | * | 2/2001 | Henderson et al. ......... 709/206 |
| 6,282,565 | B1 | * | 8/2001 | Shaw et al. ................. 709/206 |
| 6,327,581 | B1 | * | 12/2001 | Platt ............................ 706/12 |
| 6,424,995 | B1 | * | 7/2002 | Shuman ..................... 709/206 |
| 6,442,589 | B1 | * | 8/2002 | Takahashi et al. .......... 709/203 |

OTHER PUBLICATIONS

Cohen, "Learning Rules that Classify E-Mail", 1996 (as disclosed at http://www-2.cs.cmu.ecu/~wcohen/pubs-t.html).*
Lewis, "Evaluating and Optimizing Autonomous Text Classification Systems", 1995 ACM.*
Lewis, David, "Training Algorithms for Linear Text Classifiers", AT&T Laboratories, 1996.*
Apte, Chidanand, Fred Damerau, and Sholom M. Weiss, "Automated Learning of Decision Rules for Text Categorization", 1994 ACM.*
Forscher, Stewart, "CyberNag (Mailmen Division) Project Notebook", Feb. 21, 1996, Available: http://www.cc.gatech.edu/computing/classes/cs3302_96_winter/projects/groups/MailMen.*
J. Breese, D. Heckerman, & C. Kadie (1998). Empirical Analysis of Predictive Algoirthms for Collaborative Filtering. In Proceedings of the Fourteenth Conference on Uncertainty in Artificial Intelligence, pp. 43-52. AUAI, Morgan Kaufmann, San Francisco.

(Continued)

Primary Examiner—Heather R. Herndon
Assistant Examiner—R. Singh
(74) Attorney, Agent, or Firm—Amin & Turocy, LLP

(57) ABSTRACT

Prioritization of document, such as email messages, is disclosed. In one embodiment, a computer-implemented method first receives a document. The method generates a priority of the document, based on a document classifier such as a Bayesian classifier or a support-vector machine classifier. The method then outputs the priority. In one embodiment, the method includes alerting the user based on an expected loss of now-review of the document as compared to an expected cost of alerting the user of the document, at a current time. Several methods are reviewed for display and interaction that leverage the assignment of priorities to documents, including a means for guiding visual and auditory actions by priority of incoming messages. Other aspects of the machinery include a special viewer that allows users to scope a list of email sorted by priority so that it can include varying histories of time, to annotate a list of messages with color or icons based on the automatically assigned priority, to harness the priority to control the level of detail provided in a summarization of a document, and to use a priority threshold to invoke an interaction context that lasts for some period of time that can be dictated by the priority of the incoming message.

43 Claims, 15 Drawing Sheets

OTHER PUBLICATIONS

M. Czerwinkski, S. Dumais, G. Robertson, et al. (1999). Visualizing implicit queries for information management and retrieval. In Proceedings of CHI '99, ACM SIGCHI Conference on Human Factors in Computing Systems, Pittsburgh, PA, pp. 560-567. Association for Computing Machinery.

S. Dumais, J. Platt, D. Heckerman, M. Sahami (1998). Inductive learning algorithms and representations for text categorization. In Proceedings of the Seventh International Conference on Information and Knowledge Management, pp. 148-155. Association for Computing Machinery, ACM Press, New York.

E. Horvitz (1999). Principles of mixed-initiative user interfaces. In Proceedings of CHI '99, ACM SIGCHI Conference on Human Factors in Computing Systems, Pittsburgh, PA, pp. 159-166. Association for Computing Machinery.

E. Horvitz, M. Barry (1995). Display of information for time-critical decision making. In Proceedings of the Eleventh Conference on Uncertinaty in Artificial Intelligence, pp. 296-305 Montreal, Canada. Morgan Kaufmann, San Francisco.

E. Horvitz, J. Breese, D. Heckerman, D. Hovel, K. Rommelse (1998). The Lumiere project: Bayesian user modeling for inferring the goals and needs of software users. In Proceedings of the Fourteenth Conference on Uncertainty in Artificial Intelligence, pp. 256-265. Morgan Kaufmann, San Francisco.

E. Horvitz and G. Rutledge (1991). Time-dependent utility and action under uncertainty. In Proceedings of Seventh Conference on Uncertainty in Artificial Intelligence, Los Angeles, CA, pp. 151-158. Morgan Kaufmann, San Francisco.

E. Horvitz and A. Seiver (1997). Time-critical action: Representations and application. In Proceedings of the Thirteenth Conference on Uncertainty in Artificial Intelligence (UAI-97), pp. 250-257 Providence, RI. Morgan Kaufmann, San Francisco.

D. Koller, M. Sahami (1996). Toward optimal feature selection. In Proceedings of Thirteenth Conference on Machine Learning, pp. 284-292, Morgan Kaufmann, San Francisco.

H. Leiberman (1995). An agent that assist web browsing. In Proceedings of IJCAI-95, Montreal Canada. Morgan Kaufmann, San Francisco.

J. Platt (1999). Fast training of support vector machines using sequential minimal optimzation. In Advances in Kernal Methods: Support Vector Learning. MIT Press, Cambridge, MA.

J. Platt (1999). Proobabilistic outputs for support vector machines and comparison to regularized likelihood methods. In Advances in Large Margin Classifiers, MIT Press, Cambridge, MA.

M. Sahami, S. Dumais, D. Heckerman, E. Horvitz (1998). A Bayesian approach to filtering junk e-mail. In Workshop on Learning for Text Categorization, AAAI Technical Report WS-98-05. American Association for Artificial Intelligence, AAAI.

U.S. Appl. No. 09/007,894, filed Jan. 15, 1998, Horvitz, A Technique for Prefetching.

U.S. Appl. No. 09/055,477, filed Apr. 6, 1998, Methods and Apparatus for.

* cited by examiner

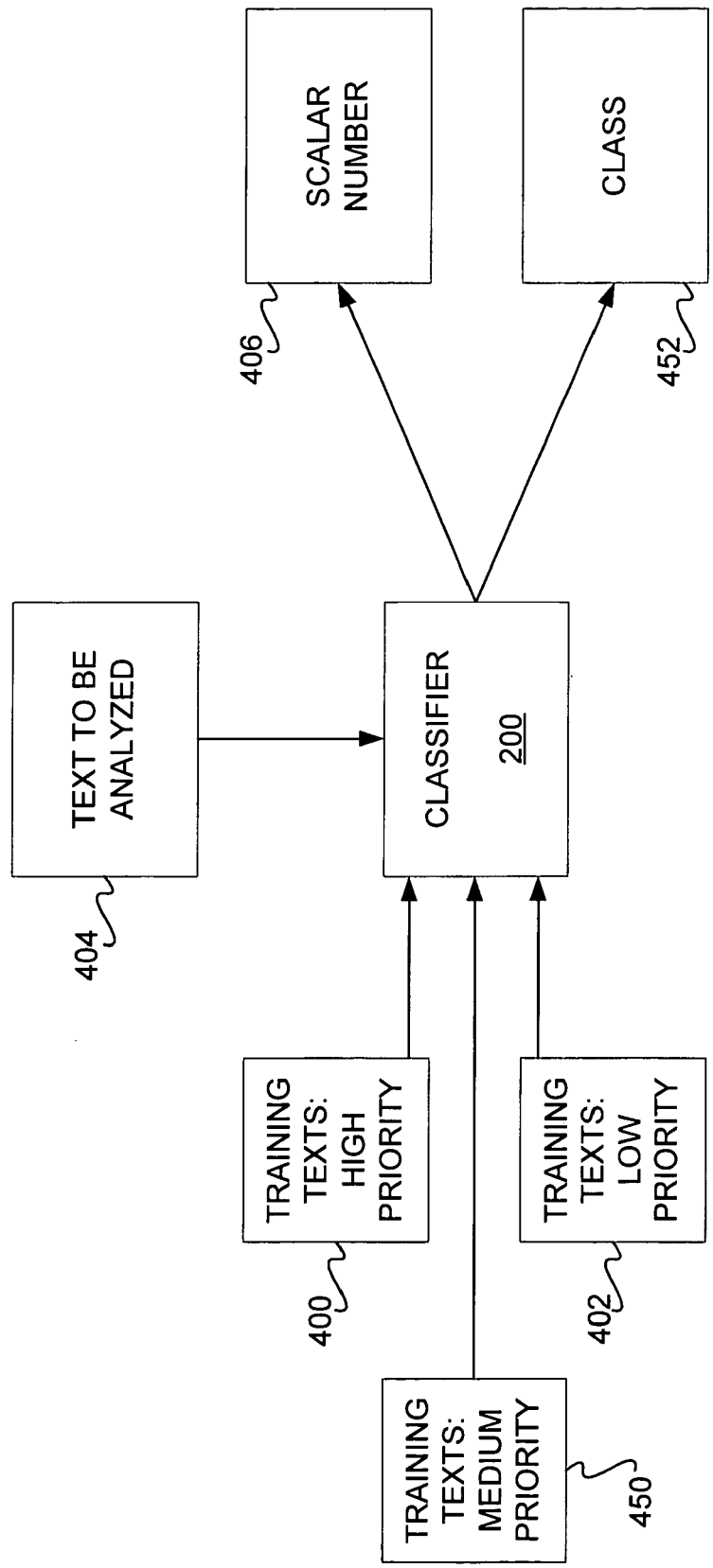

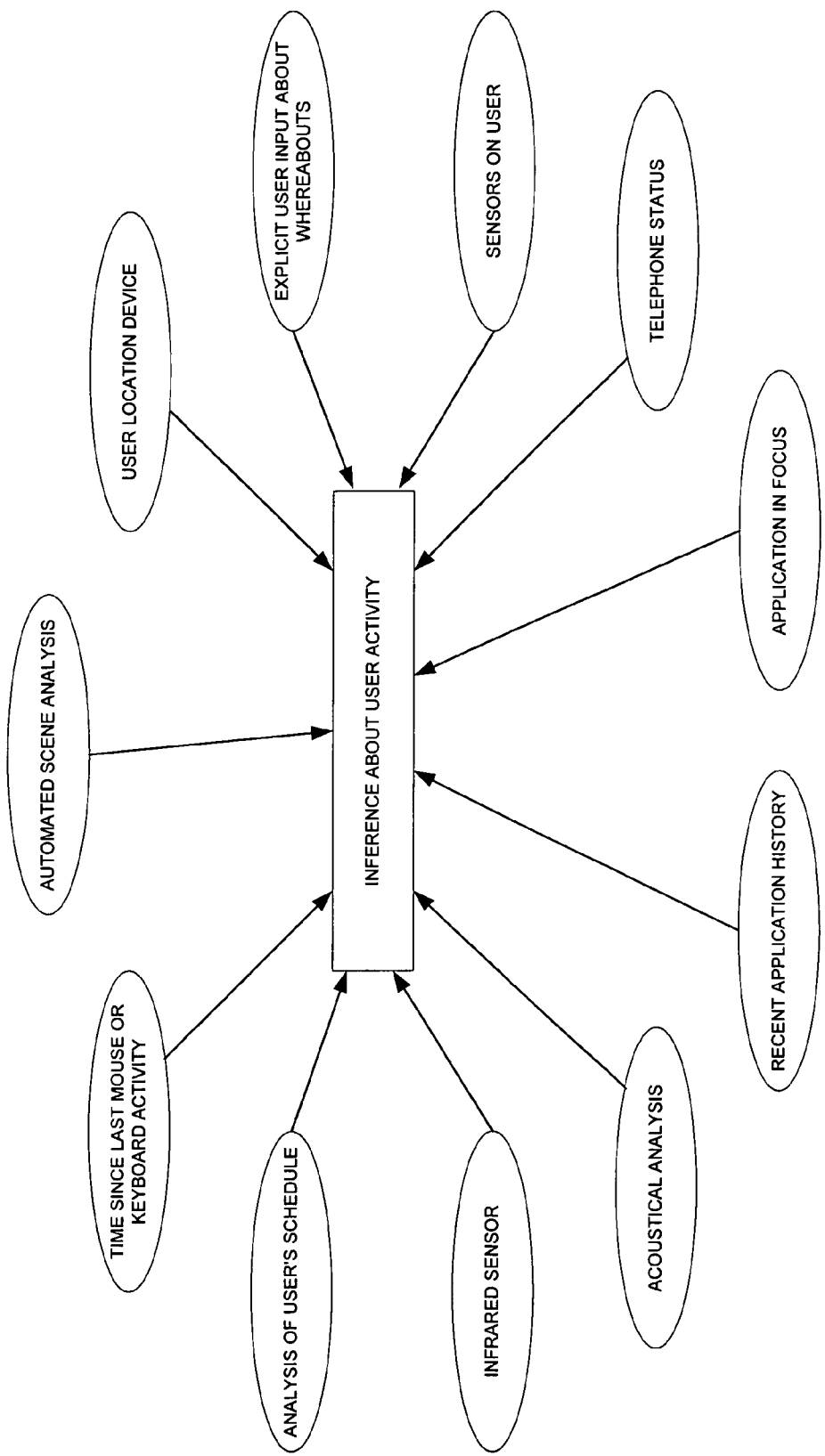

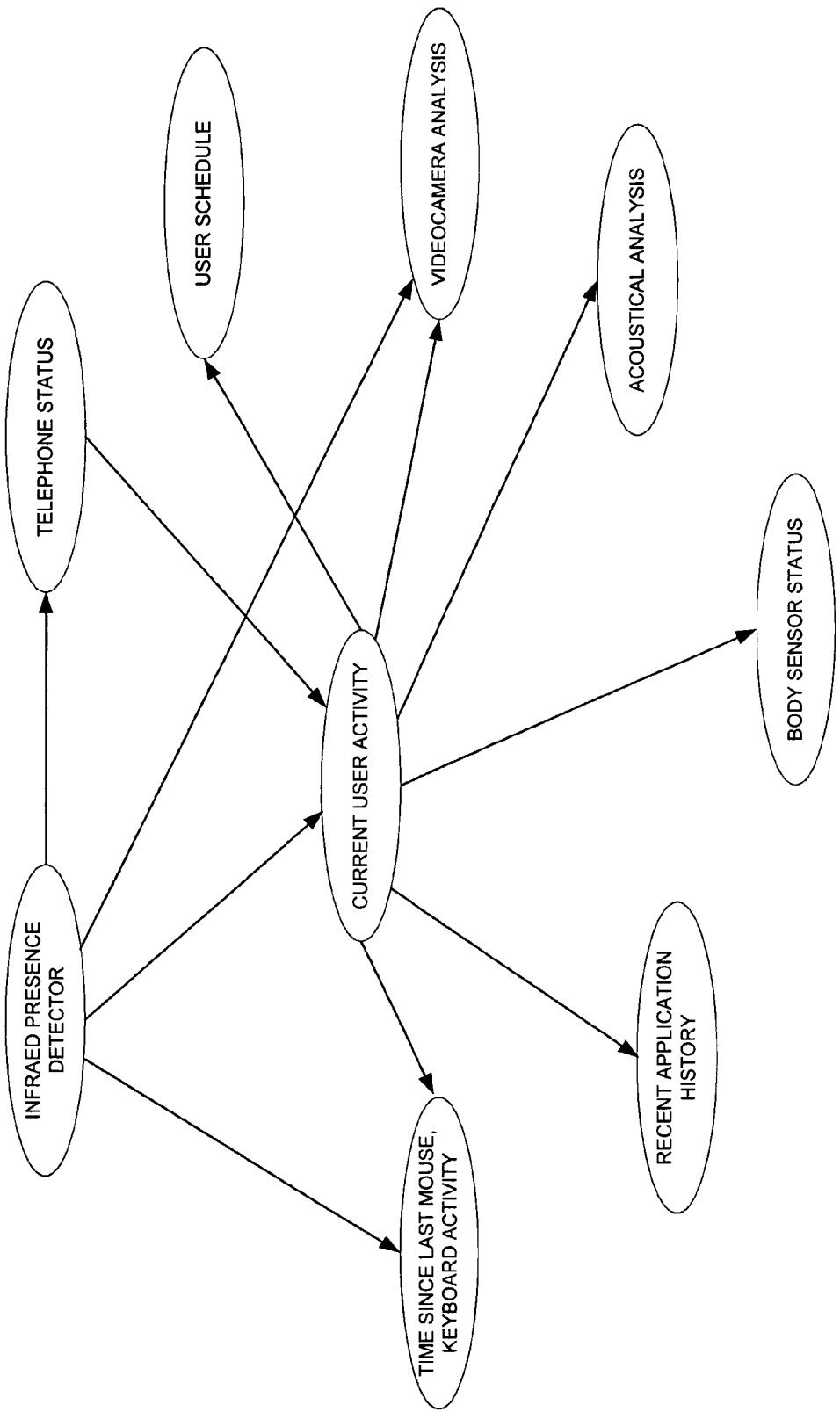

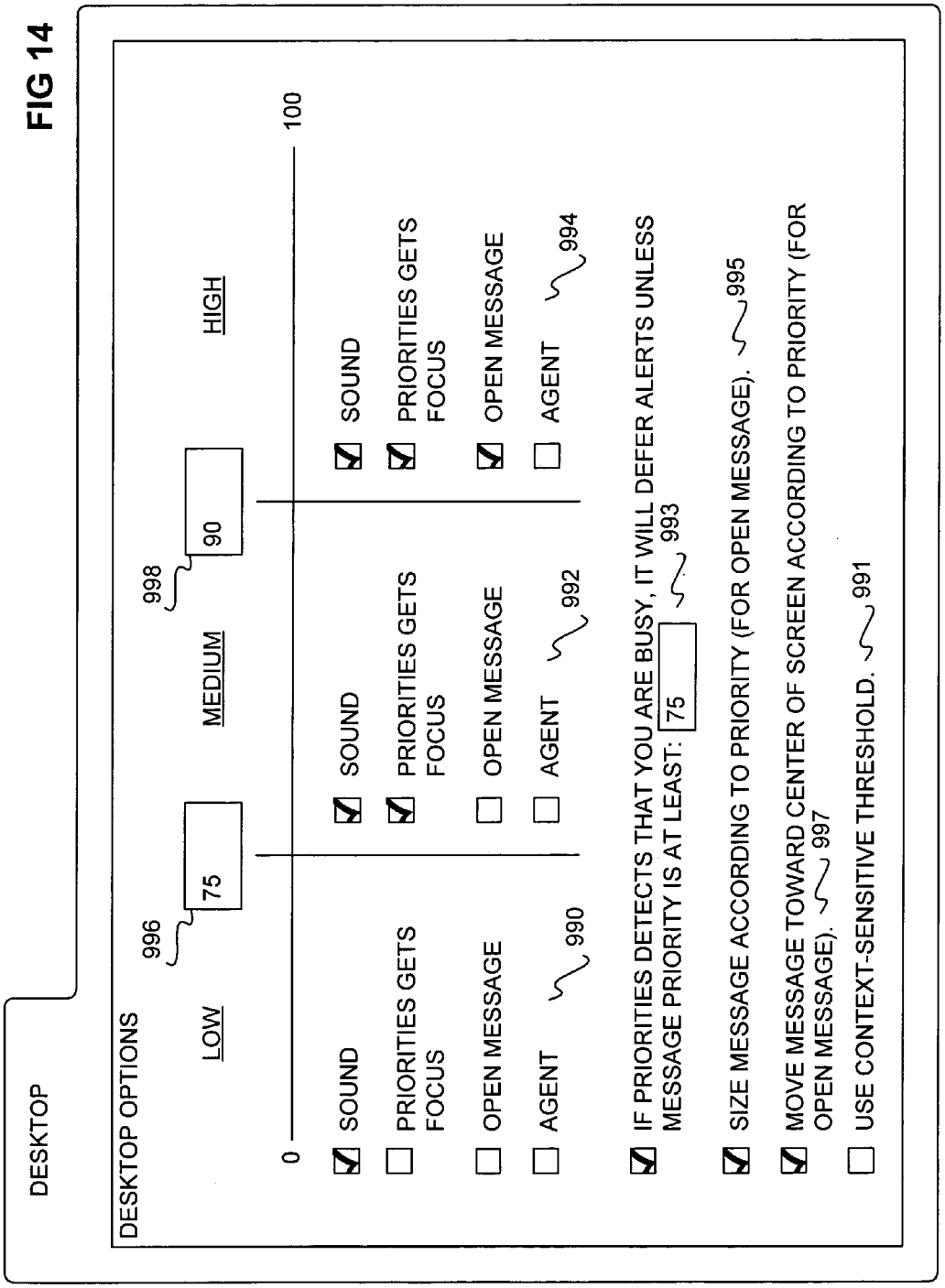

METHODS FOR DISPLAY, NOTIFICATION, AND INTERACTION WITH PRIORITIZED MESSAGES

RELATED APPLICATIONS

This application is related to the cofiled, copending and coassigned applications entitled "Methods for Automatically Assigning Priorities to Documents and Messages", "Integration of a Computer-Based Message Priority System with Mobile Electronic Devices", "Methods for Routing Documents Based on a Measure of Criticality", and "A Computational Architecture for Managing the Transmittal and Rendering of Information, Alerts, and Notifications".

FIELD OF THE INVENTION

This invention relates generally to prioritized document such as prioritized email messages, and more particularly to methods for displaying and alerting about prioritized documents.

BACKGROUND OF THE INVENTION

Electronic mail programs have become a popular application among computer users. Especially with the advent of the Internet, exchanging email has almost become a reason why people purchase computers for personal reasons, and within many corporate environments, email has become the standard manner by which coworkers exchange information. However, with the increasing popularity of email, shortcomings have become apparent.

Chief among these shortcomings is that many users now face a deluge of email every day, such that the capability of being able to send and receive email has almost become a hindrance to their day-to-day ability to get their job done, as opposed to being an asset. Some users report receiving over 100 email messages a day. With such large numbers of email, it is difficult to manage the email, such that the users read the most important messages first.

Limited solutions to this problem have been attempted in the prior art. Prior art exists for attempting to curtail the amount of junk email—e.g., unsolicited email, typically regarding a service or product for sale—that users receive. Moreover, some electronic mail programs allow for the generation of rules that govern how an email is managed within the program—for example, placing all emails from certain coworkers in a special folder.

These limited solutions, however, do not strike at the basic problem behind email—that with so much email being received, it would be most useful for a user to be able to have his or her computer automatically prioritize the email, and perform actions based on that prioritization. For these and other reasons, there is a need for the present invention.

SUMMARY OF THE INVENTION

The invention relates to display, notification, and interaction with prioritized documents such as email messages. In one embodiment, a method first receives a document, and assigns a measure of priority to the document based on a document classifier. A user is then alerted to the document, based on a predetermined or dynamically identified criteria. For example, the user can be alerted by a sound of a specific nature and amplitude being played, by a notification summarizing the document being displayed, by the document being opened and displayed automatically, by the document window defining the borders framing the document, by the document being resized or centrally located, and by the document receiving different degrees of focus on the user's display.

Embodiments of the invention provide for advantages over the prior art. A user, for example, in one embodiment, may ask that he or she only be disturbed if the priority of a newly received document is greater than a given threshold. Thus, even if the user receives over 100 different email messages, he or she will be alerted to the most important email, and then will be able to deal with the other email when the user has time. Prioritization, in other words, makes email much more useful in environments where a large quantity of email is exchanged on a regular basis.

Embodiments of the invention include computer-implemented methods, computer-readable media, and computerized systems of varying embodiments. Still other embodiments, advantages and aspects of the invention will become apparent by reading the following detailed description, and by reference to the drawings.

BRIEF DESCRIPTION OF THE DRAWINGS

FIG. 4(b) is a diagram of another scheme according to which the priority of a document can be classified, according to another embodiment of the invention;

FIG. 6 is a diagram showing classes of evidence that can be used to make an inference about a user's activity (e.g., if a user is present), according to one embodiment of the invention;

FIG. 7 is a diagram showing a Bayesian network that can be used for inferring a user's activity (e.g., if a user is present), according to one embodiment of the invention;

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. (It is noted that the terms document and text are used interchangeably herein and should be construed as interchangeable as well.)

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
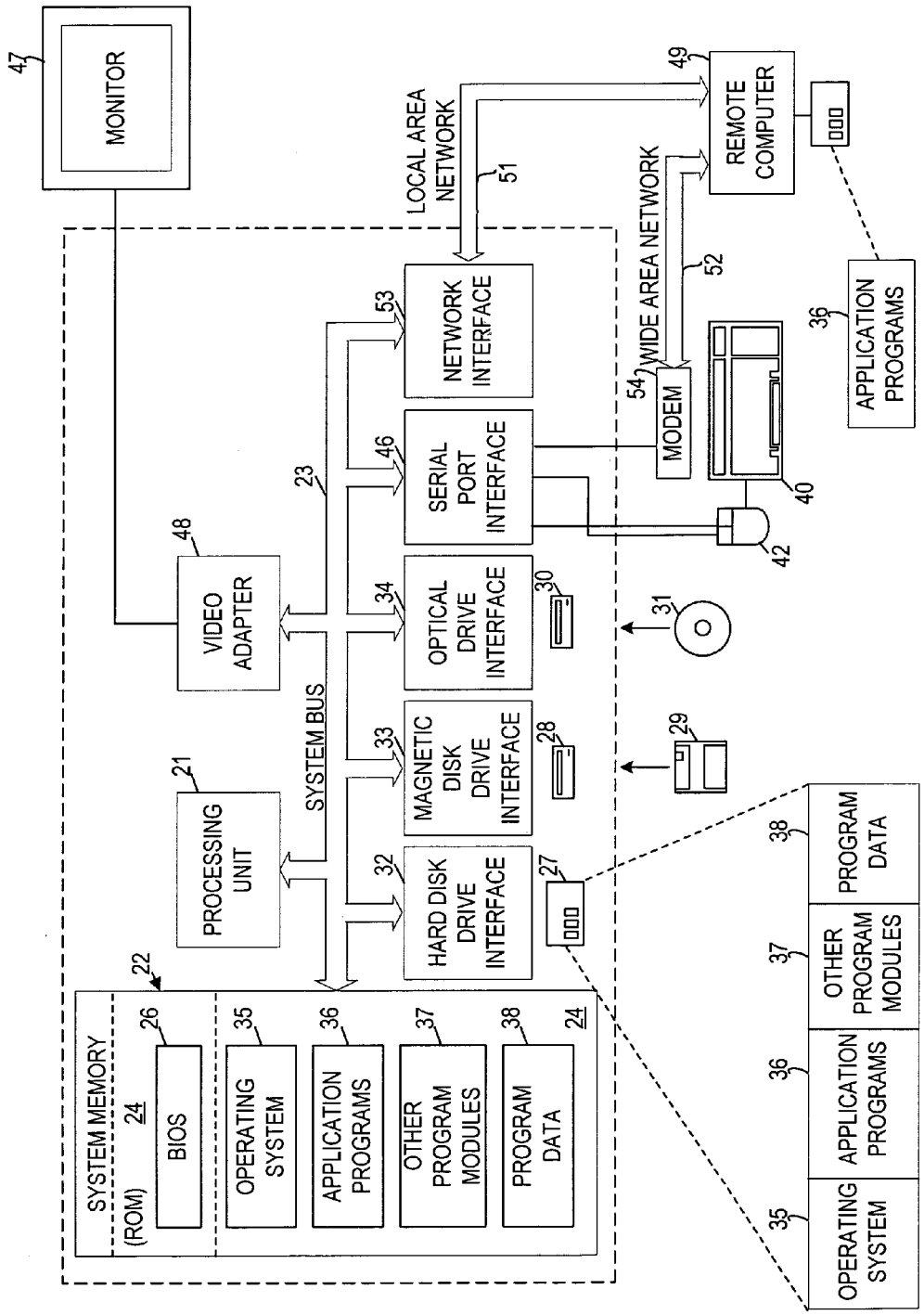
FIG. 1 is a diagram of an operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general case of computer-executable instructions, such as program modules, being executed by a computer, such as a personal computer. Generally, program modules include routines, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Generating a Priority for a Newly Received Document

In this section of the detailed description, the generation of a priority for a document such as an email, according to one embodiment of the invention, is described. The generation of priorities for documents as described can then be used in methods, systems, and computer-readable media (as well as other embodiments) of the invention as are presented in other sections of the detailed description. The description in this section is provided in conjunction with FIG. 2 and FIG. 3, the former which is a diagram showing explicit and implicit training of a document classifier, according to an embodiment of the invention, and the latter which is a diagram showing how a priority for a document is generated by input to a document classifier, according to an embodiment of the invention. The description is also provided in conjunction with FIGS. 4(a) and 4(b), which are diagrams of different schema according to which the priority of a document can be classified, and in conjunction with FIGS. 5(a) and 5(b), which are graphs showing different cost functions that may be applicable depending on document type.

Figure 2:
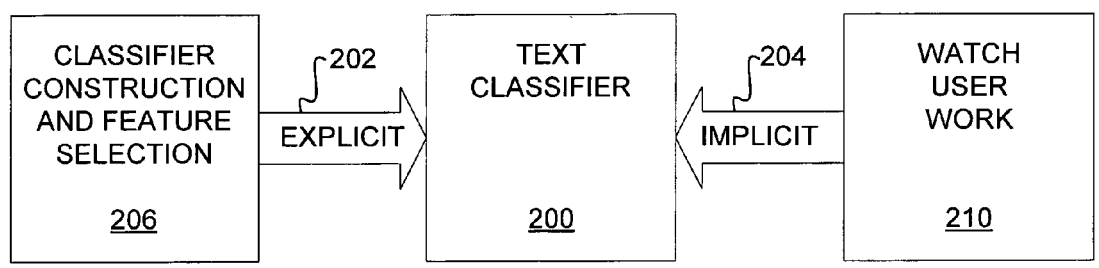
FIG. 2 is a diagram showing explicit and implicit training of a document classifier, according to an embodiment of the invention.

Referring first to FIG. 2, the document classifier 200 is able to be trained both explicitly, as represented by the arrow 202, and implicitly, as represent by the arrow 204. The explicit training represented by the arrow 202 is usually conducted at the initial phases of constructing the document classifier 200, while the implicit training represented by the arrow 204 is usually conducted after the document classifier 200 has been constructed, to fine tune the classifier 200. However, the invention is not so limited.

The document classifier 200 in one embodiment is a Bayesian classifier, as known within the art, while in another embodiment it is a support vector machine (SVM) classifier, as also known within the art. Document classification methodology based on a Bayesian learning approach is specifically described in the reference M. Sahami, S. Dumais, D. Heckerman, E. Horvitz, A Bayesian Approach to Junk E-Mail Filtering, AAAI Workshop on Document Classification, July 1998, Madison, Wis., AAAI Technical Report WS-98-05, which is hereby incorporated by reference. Document classification methodology based on an SVM approach is specifically described in the following references: the coassigned patent, U.S. Pat. No. 5,864,848, issued Jan. 26, 1999, which is hereby incorporated by reference; the previously filed and coassigned case entitled "Methods and Apparatus for Building a Support Vector Machine Classifier," Ser. No. 09/055,477, filed on Apr. 6, 1998, which is also hereby incorporated by reference; and, the reference J. Platt, Fast Training of Support Vector Machines using Sequential Minimal Optimization, MIT Press, Baltimore, Md., 1998, which is also hereby incorporated by reference. For purposes of this application, specific description is made with reference to an SVM classifier, although those of ordinary skill within the art can appreciate that the invention is not so limited.

As shown in FIG. 2, the explicit training of the document classifier 200 as represented by the arrow 202 includes constructing the classifier in 206, including utilizing feature selection. In general, Support Vector Machines build classifiers by identifying a hyperplane that separates a set of positive and negative examples with a maximum margin. In the linear form of SVM that is employed in one embodiment, the margin is defined by the distance of the hyperplane to the nearest positive and negative cases for each class. Maximizing the margin can be expressed as an optimization problem. A post-processing procedure described in the Platt reference is used that employs regularized maximum likelihood fitting to produce estimations of posterior probabilities. The method fits a sigmoid to the score that is output by the SVM classifier.

In the explicit training, the document classifier is presented with both time-critical and non-time-critical documents (e.g., email messages), so that it may be able to discriminate between the two. This training set may be provided by the user, or a standard training set may be used. Given a training corpus, the document classifier first applies feature-selection procedures that attempt to find the most discriminatory features. This process employs a mutual-information analysis. Feature selection can operate on single words or higher-level distinctions made available, such as phrases and parts of speech tagged with natural language processing—that is, the document classifier 200 is able to be seeded with specially tagged document to discriminate features of a document that are considered important.

Feature selection for document classification typically performs a search over single words. Beyond the reliance on single words, domain-specific phrases and high-level patterns of features are also made available. Special tokens can also enhance classification. The quality of the learned classifiers for email criticality can be enhanced by inputting to the feature selection procedures handcrafted features that are identified as being useful for distinguishing among email of different time criticality. Thus, during feature selection, single words as well as special phrases and symbols that are useful for discriminating among messages of different levels of time criticality are considered.

Tokens and patterns of value in identifying the criticality of messages include such distinctions as (including Boolean combinations thereof):

To: field

Addressed just to user

Addressed to only a few people including user

Addressed to an alias with a small number of people

Addressed to several aliases with a small number of people

Cc:'d to user

Bcc:'d to user

People

Names on pre-determined list of important people

Family members

People at company

Organization chart structure
   Managers I report to
   Managers of managers of people I report to
   People who report to me External business people Past tense These include descriptions about events that have already occurred such as:

We met meeting went happened got together took care of meeting yesterday

Future tense

Tomorrow

This week

Are you going to

When can we

Meeting and coordination

Get together

Can you meet

Will get together

Coordinate with

Need to get together

Resolved dates

Dates indicated from document and msg. time (e.g., tomorrow, send yesterday)

Questions

Word+?

Indications of personal requests:

Can you

Are you

Will you you please

Can you do

Indications of need:

I need

He needs

She needs

I'd like

It would be great

I want

He wants

She wants

Take care of

Time criticality happening soon right away deadline will be deadline is as soon as possible needs this soon to be done soon done right away Importance is important is critical Word+!

Explicit priority flag status (low, none, high)

Length of message

Number of bytes in component of new message

Signs of Commercial and Adult-Content Junk email

Free!!

!!!

Under 18

Adult

Percent caps

Percent nonalphanumeric characters etc.

Other features that may be used for feature selection are described in the cofiled, copending and coassigned application entitled "A Computational Architecture for Managing the Transmittal and Rendering of Information, Alerts, and Notifications", which is hereby incorporated by reference, and in the copending and coassigned application entitled "Methods and Apparatus for Building a Support Vector Machine Classifier," Ser. No. 09/055,477, filed on Apr. 6, 1998, which has already been incorporated by reference.

Furthermore, still referring to FIG. 2, implicit training of the document classifier 200, as represented by the arrow 204, can be conducted by continually watching the user work in 210. The assumption is that as users work, and lists of mail are reviewed, time-critical messages are read first, and low-priority messages are reviewed later, or just deleted. That is, when presented with a new email, the user is watched to determine whether he or she immediately opens the email, and in what order (if more than one new email are present), deletes the email without opening, and/or replies to the email right away. Thus, the document classifier is such that a user is continually watched while working, and the classifier is continually refined by training in the background and being updated in real time for decision making. For each message inputted into the classifier, a new case for the classifier is created. The cases are stored as negative and positive examples of documents that are either high or low priority.

Figure 3:
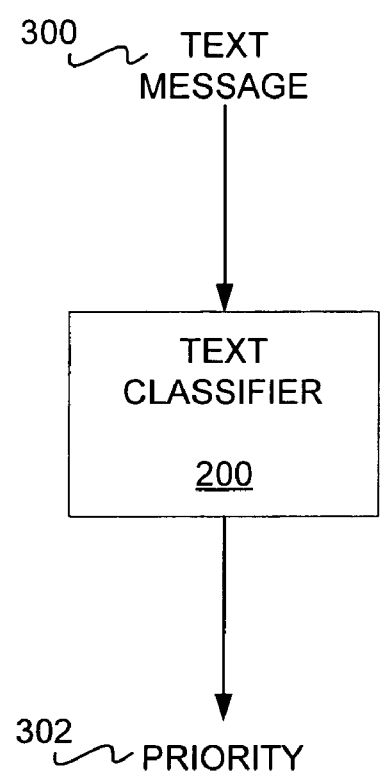
FIG. 3 is a diagram showing how a priority for a document is generated by input to a document classifier, according to an embodiment of the invention.
Figure 4A:
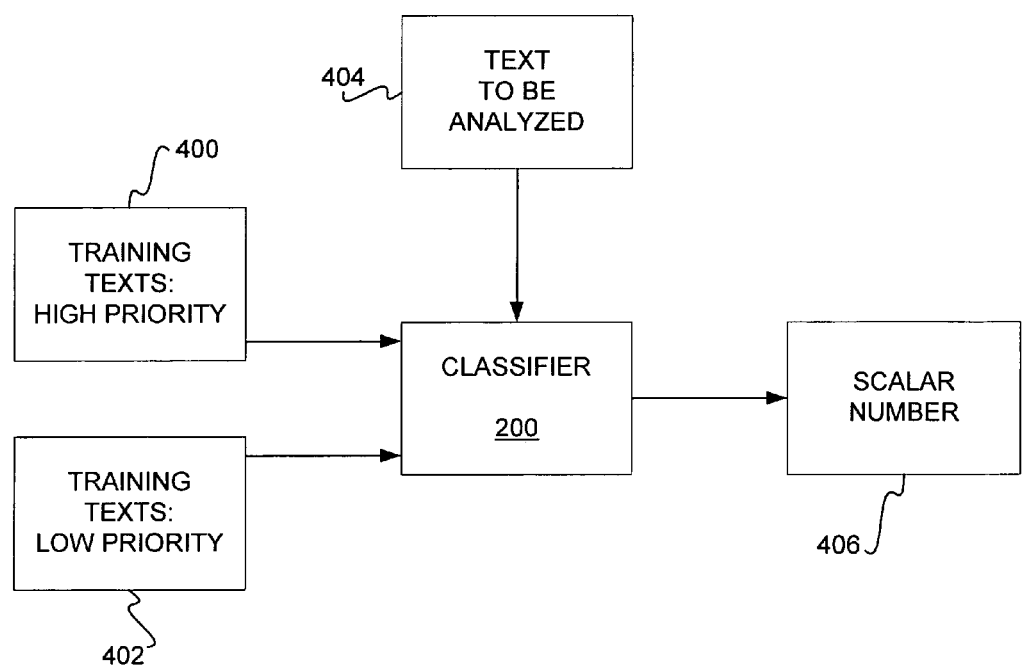
FIG. 4(a) is a diagram of a scheme according to which the priority of a document can be classified, according to an embodiment of the invention.

Referring next to FIG. 3, a document, such as an email message 300, is input into the document classifier 200, which based thereon generates a priority 302 for the document 300. That is, in one embodiment, the document classifier 200 generates a priority 302, measured as a percentage from 0 to 1 (i.e., 0% to 100%). This percentage is a measure of the likelihood that the document 300 is of high priority, based on the previous training of the classifier 200.

It is noted that as has been described, the document classifier and the priority generated thereby is based on a scheme where each email in the training phase is construed as either high priority or low priority, such that the priority generated by the document classifier is a measure of the likelihood of the document being analyzed is of high priority. This scheme is specifically shown by reference to FIG. 4(a), where the document classifier 200 is trained by a group of documents 400 that are high priority and a group of documents 402 that are low priority, such that a document to be analyzed 400 is input into the classifier 200, which outputs a scalar number 406 measuring the likelihood that the document being analyzed is of high priority. However, those of ordinary skill within the art can appreciate that the invention is not so limited.

For example, referring to FIG. 4(b), a diagram showing a scheme where documents are divided into low, medium and high priority, according to an embodiment of the invention, is shown. The document classifier 200 in the embodiment of FIG. 4(b) is trained by a group of documents 400 that are high priority and a group of documents 402 that are low priority, as in the previous embodiment, but also by a group of documents 450 that are medium priority. Thus, a document to be analyzed 400 is input into the classifier 200, which outputs a scalar number 406, that can measure the likelihood that the document being analyzed is of high priority, if so desired, or medium priority or low priority. The classifier 200 is also able to output a class 452, which indicates the class of low, medium or high priority that the document 404 most likely falls into. Those of ordinary skill within the art can appreciate that further classes can also be added if desired.

The invention is not limited to the definition of priority as this term is used by the document classifier to assign such priority to a document such as an email message. In one embodiment, however, priority is defined in terms of a loss function. More specifically, priority is defined in terms of the expected cost in lost opportunities per time delayed in reviewing the document after it has been received—that is, the expected loss or cost that will result for delayed processing of the document. This loss function can further vary according to the type of document received.

Figure 5A:
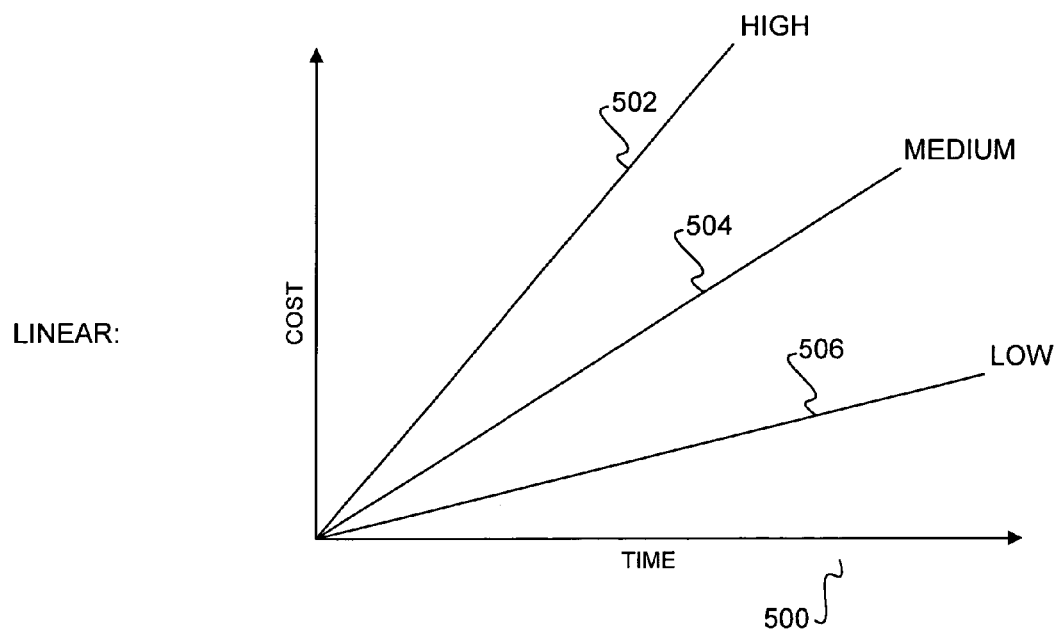
FIG. 5(a) is a graph showing linear cost functions of high, medium and low priority documents, according to an embodiment of the invention.

For example, the general case is shown in FIG. 5(a), which is a graph of linear cost functions dependent on the priority of a document. In the graph 500, as time increases, the cost of not having reviewed a document also increases. However, the cost increases more for a high priority message, as indicated by the line 502, as compared to a medium priority message, as indicated by the line 504, or a low priority message, as indicated by the line 506. That is, the high priority line 502 may have a slope of 100, the medium priority line 504 may have a slope of 10, and the low priority line 502 may have a slope of 1. These slope values can then be used by the document classifier to assist in assigning a priority to a given document, for example, by regression analysis.

Figure 5B:
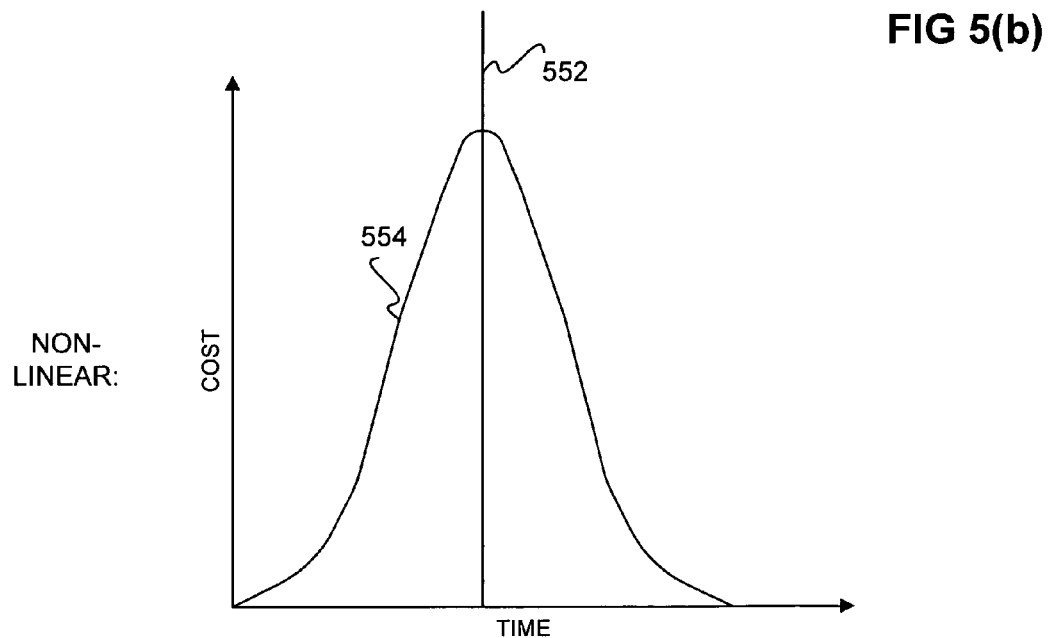
FIG. 5(b) is a graph showing a non-linear cost function for a document, according to an embodiment of the invention.

Some messages, however, do not have their priorities well approximated by the use of a linear cost function. For example, a message relating to a meeting will have its cost function increase as the time of the meeting nears, and thereafter, the cost function rapidly decreases—since after the meeting is missed, there is not much generally a user can do about it. This situation is better approximated by a non-linear cost function, as shown in FIG. 5(b). In the graph 550, the cost function 554 rapidly increases until it reaches the time of the meeting demarcated by the line 552, after which it rapidly decreases. Thus, those of ordinary skill within the art can appreciate that depending on a message's type, the cost function can be approximated by one of many different representative cost functions, both linear and non-linear.

Thus, as has been described, the priority of a document can be just the likelihood that it is of high priority based on output of a document classifier, or the most likely priority class (i.e., medium, low or high priority) it falls into, also based on the output of the document classifier. However, in another embodiment of the invention, an expected time criticality of each document, such as an email message, is determined. This can be written as $$EL = \sum_{i}^{n} p(critical_i) C(critical_i)$$

where EL is the expected loss, $p(critical_i)$ is the probability that a document has the criticality i (e.g., where i=0 may be low priority and i=1 may be high priority, or where i=0 may be low priority, i=1 medium priority and i=2 high priority, etc.), $C(critical_i)$ is the cost function for document having the criticality i, and n is the total number of criticality classes minus one. The cost functions may be linear or non-linear, as has been described—in the case where the function are linear, the cost function is thus the rate of loss.

In the case where n=1, specifying that there are only two priority classes low and high, the expected loss can be reformulated as $$EC = p(critical_{high}) C(critical_{high}) + [1 - p(critical_{low})] C(critical_{low})$$

where EC is the expected criticality of a document. Furthermore, if the cost function of low criticality messages is set to zero, this becomes $$EC = p(critical_{high}) C(critical_{high})$$

The total loss until the time of review of a document can be expressed as the integration of the expressed criticality, or, $$EL = \int_0^t p(critical_{high}) C(critical_{high})$$

where t is the time of review.

Determining When to Alert the User

In this section of the detailed description, described is provided as to determining when to alert the user of a high-priority document, for example, a document that has a likelihood of being high priority greater than a user-set threshold, or greater than a threshold determined by decision-theoretic reasoning. That is, beyond knowing about time-critical messages, it is also important in one embodiment to decide when to alert a user to time-critical messages if the user is not directly viewing incoming email (in one embodiment). In the general case, a cost of distracting the user from the current task being addressed to learn about the time-critical message is determined.

In general, a user should be alerted when a cost-benefit analysis suggests that the expected loss the user would incur in not reviewing the message at time t is greater than the expected cost of alerting the user. That is, alerting should be conducted if $$EL-EC>0$$

where EL is the expected loss of non-review of the document at a current time t, and EC is the expected cost of alerting the user of the document at the current time t. The expected loss is as described in the previous section of the detailed description.

However, this formulation is not entirely accurate, because the user is assumed to review the message on his or her own at some point in the future anyway. Therefore, in actuality, the user should be alerted when the expected value of alerting, referred to as EVA, is positive. The expected value of alerting should thus consider the value of alerting the user of the document now, as opposed to the value of the user reviewing the message later on his or her own, without alert, minus the cost of alerting. This can be stated as $$EVA=EL_{alert}-EL_{no\text{-}alert}-EC$$

where $EL_{alert}$ is the expected loss of the user reviewing the message if he or she were to review the message now, upon being alerted, as opposed to $EL_{no\text{-}alert}$, which is the expected loss of the user reviewing the message on his or her own at some point, without being alerted, minus EC, the expected cost of alerting (now).

Furthermore, in one specific embodiment of the invention, information from several messages are grouped together into a single compound alert. Reviewing information about multiple messages in an alert can be more costly than an alert relaying information about a single messages. Such increases in distraction can be represented by making the cost of an alert a function of its informational complexity. It is assumed that the EVA of an email message is independent of the EVA of the other email messages. EVA($M_i$,t) is used to refer to the value of alerting a user about a single message $M_i$ at time t and ECA(n) is used to refer to the expected cost of relaying the content of n messages. Thus, multiple messages can be considered by summing together the expected value of relaying information about a set of n messages, $$NEVA = \sum_{i=1}^{} EVA(M_i, t) - ECA(n).$$

In one embodiment of the invention, it is noted that determining when to alert the user is conducted in accordance with the more rigorous treatment of EVA described in the copending, cofiled and coassigned application entitled "A Computational Architecture for Managing the Transmittal and Rendering of Information, Alerts, and Notifications", which is hereby incorporated by reference. However, the invention is not so limited.

It is also noted that in order to determine the expect cost of alerting, it is useful to infer or directly access information about whether the user is present—and therefore can see or hear alerts from the computer—or is not present. Sensors can be used in one embodiment that indicate when a user is in the office, such as infrared sensors, pressure sensors (on the chair), etc. However, if such devices are not available, a probability that a user is in the office can be assigned as a function of user activity on the computer, such as the time since last observed mouse or keyboard activity. Furthermore, scheduling information available in a calendar can also be made use of to make inferences about the distance and disposition of a user, to consider the costs of forwarding messages to the user by different means (e.g., cell phone, pager, etc.).

It is also important to know how busy the user is in making decisions about interrupting the user with information about messages with high time criticality. In one embodiment, it is reasoned about whether and the rate at which a user is working on a computer, or whether the user is on the telephone, speaking with someone, or at a meeting at another location. In one embodiment, several classes of evidence can be used to assess a user's activity or his or her focus of attention, as shown in FIG. 6. A Bayesian network, as known in the art, can then be used for performing an inference about a user's activity; an example of such a network is shown in FIG. 7. Utilizing evidence to infer whether the user is present is described more rigorously in the cofiled, copending and coassigned application entitled "A Computational Architecture for Managing the Transmittal and Rendering of Information, Alerts, and Notifications", which has already been incorporated by reference (specifically, with respect to determining an alert-reception probability). Thus, in one embodiment, a probability inference as to whether a user is present is determined in accordance with the description provided in this application.

In general, a decision should be made as to when and how to alert users to messages and to provide services (for example) based on the inference of expected criticality and user activity. In one embodiment, this decision is made as described in the cofiled, copending and coassigned application entitled "A Computational Architecture for Managing the Transmittal and Rendering of Information, Alerts, and Notifications", which has already been incorporated by reference (specifically, with respect to the attention management module). Fix above to be consistent with comments, changes in other related cases . . . .

Figure 8:
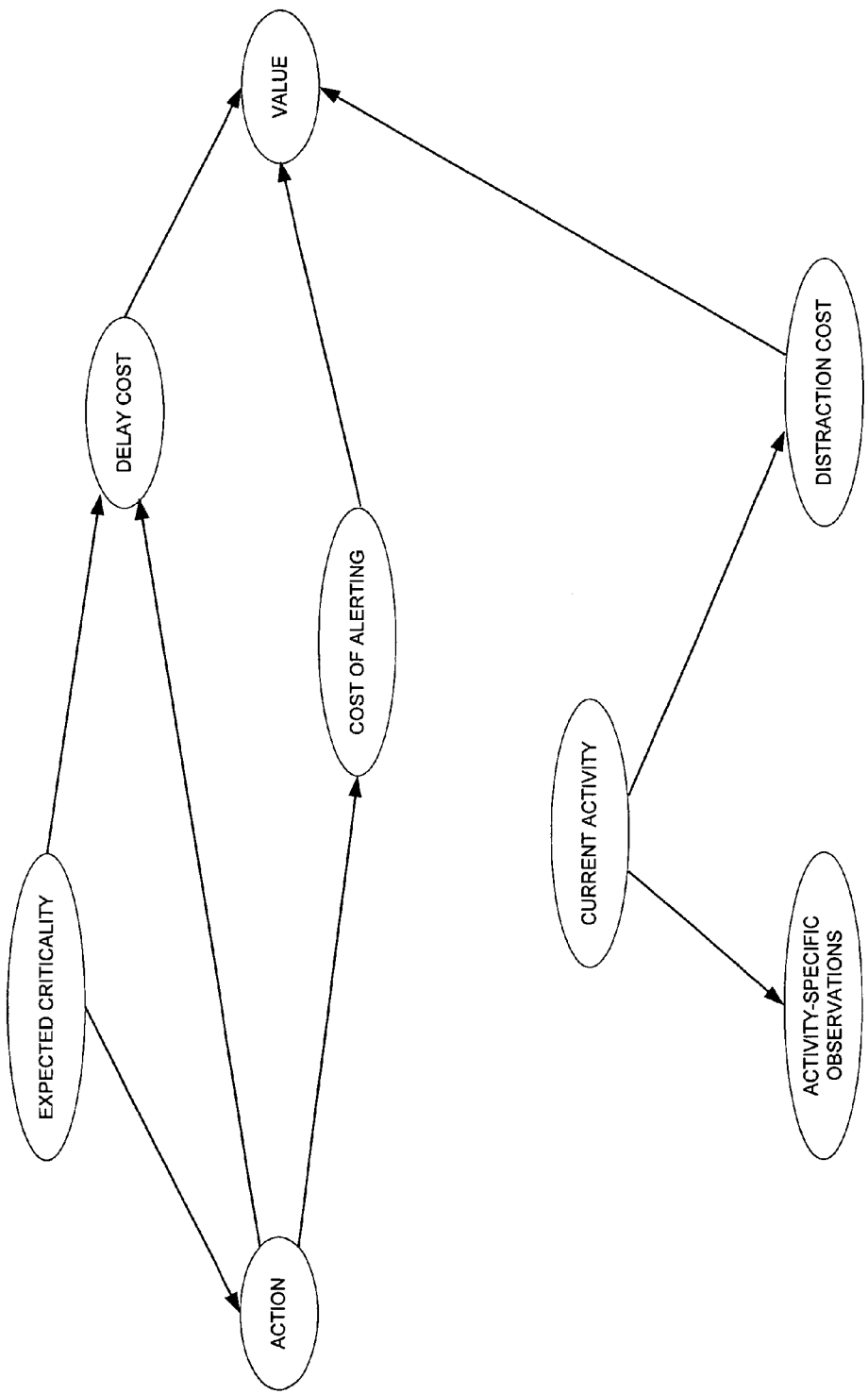
FIGS. 8–10 are influence diagrams showing how in one embodiment decision models can be utilized to make the decision as to how and when to alert a user to a message.
Figure 9:
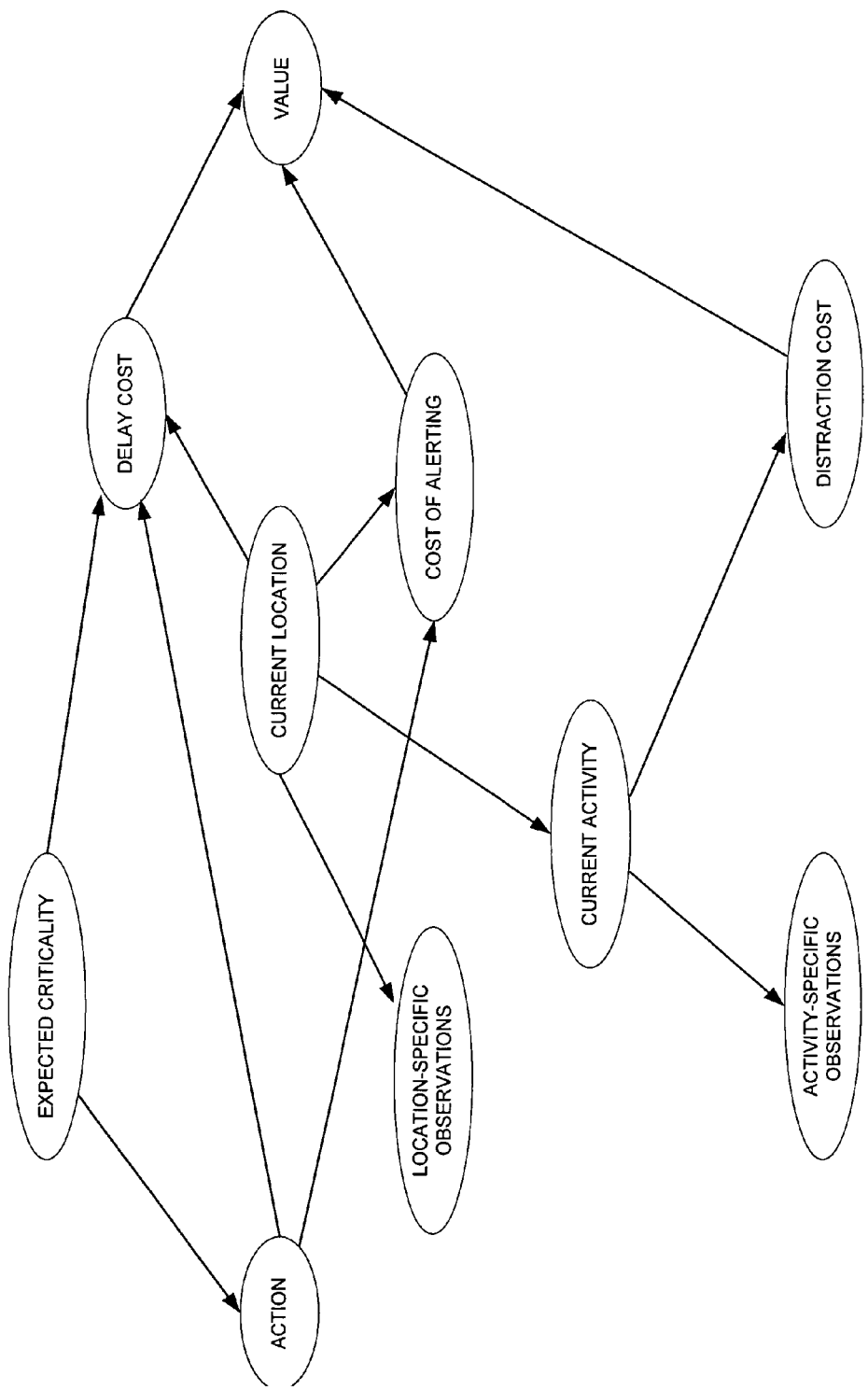
Figure 10:
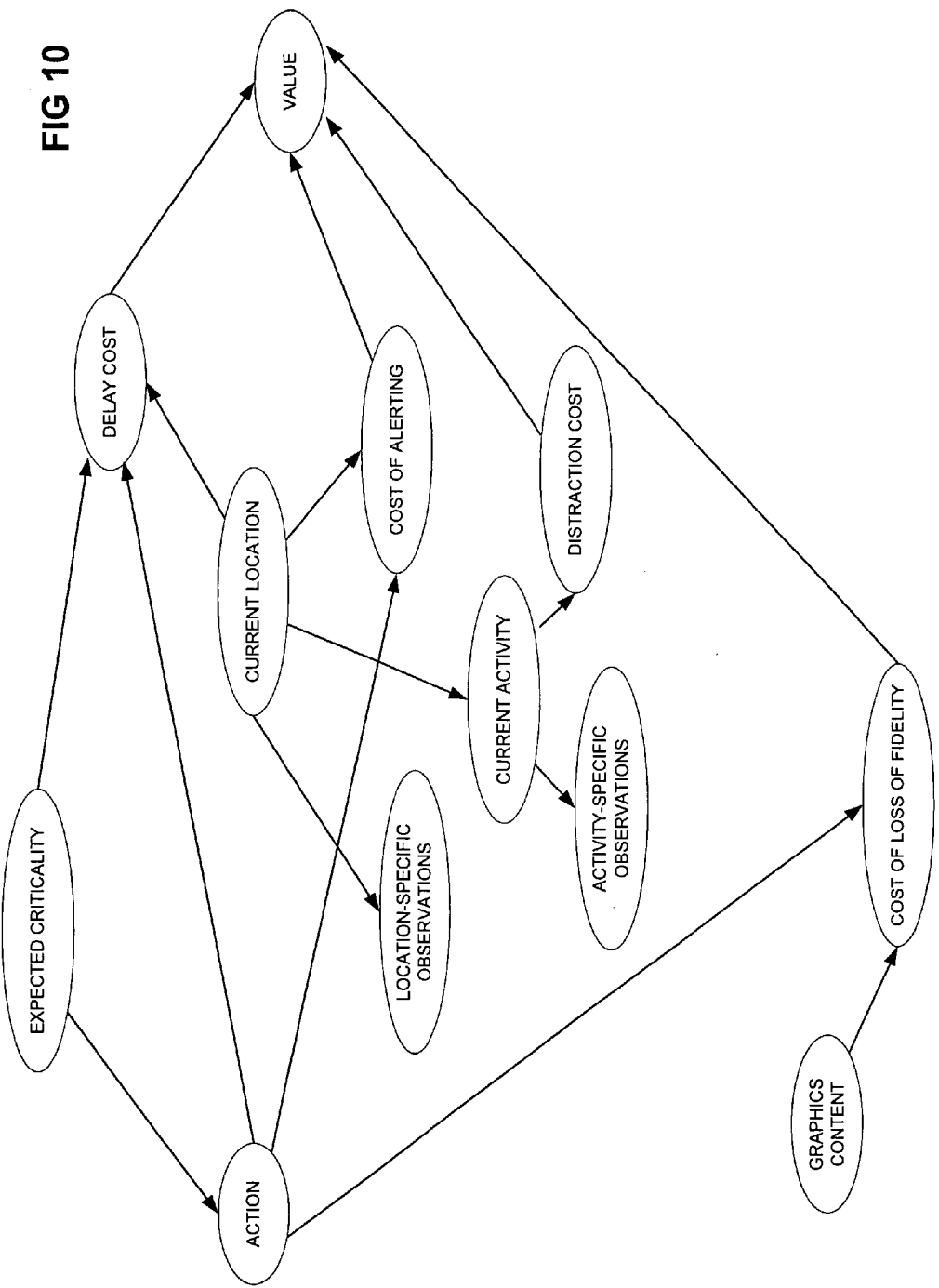

In another embodiment, this decision is made by utilizing decision models, as known within the art. FIGS. 8–10 are influence diagrams, as known within the art, showing how in one specific embodiment such decision models can be utilized to make this decision. Specifically, FIG. 8 displays a decision model for decisions about interrupting a user, considering current activity, expected time criticality of messages, and cost of alerting depending on the modality. FIG. 9 also includes variables representing the current location and the influence of that variable on activity and cost of the alternate messaging techniques. Finally, FIG. 10 is further expanded to consider the costs associated with losses in fidelity when a message with significant graphics content is forwarded to a user without the graphical content being present.

In still another embodiment, the decision as to when and how to alert users is made by employment of a set of user-specified thresholds and parameters defining policies on alerting. In this embodiment, user presence can be inferred based on mouse or keyboard activity. Thus, a user can be allowed to input distinct thresholds on alerting for inferred states of activity and nonactivity. Users can input an amount of idle activity following activity where alerting will occur at lower criticalities. In this embodiment, if it is determined that the user is not available based on the time that no computer activity is seen—or on the user's inactivity when an attempt to alert is made—then messages are stored, and are reported to the user in order of criticality when the user returns to interact with the computer (or, returns to the room, given the availability of inputs from infrared or other presence detection).

Furthermore, in this embodiment, users can specify routing and paging options (as well as other output options) as a function of quantities including expected criticality, maximum expected loss, and value of alerting the user. Such routing, paging and other output options are more specifically described in the copending, cofiled, and coassigned applications entitled "Integration of a Computer-Based Message Priority System with Mobile Electronic Devices", and "Methods for Routing Documents Based on a Measure of Criticality", which are all hereby incorporated by reference. The invention is not so limited, however.

Method and System

In this section of the detailed description, a computer-implemented method according to an embodiment of the invention is described, and a computerized system according to an embodiment of the invention is described. With respect to the method, the method is desirably realized at least in part as one or more programs running on a computer—that is, as a program executed from a computer-readable medium such as a memory by a processor of a computer. The program is desirably storable on a machine-readable medium such as a floppy disk or a CD-ROM, for distribution and installation and execution on another computer.

Figure 11:
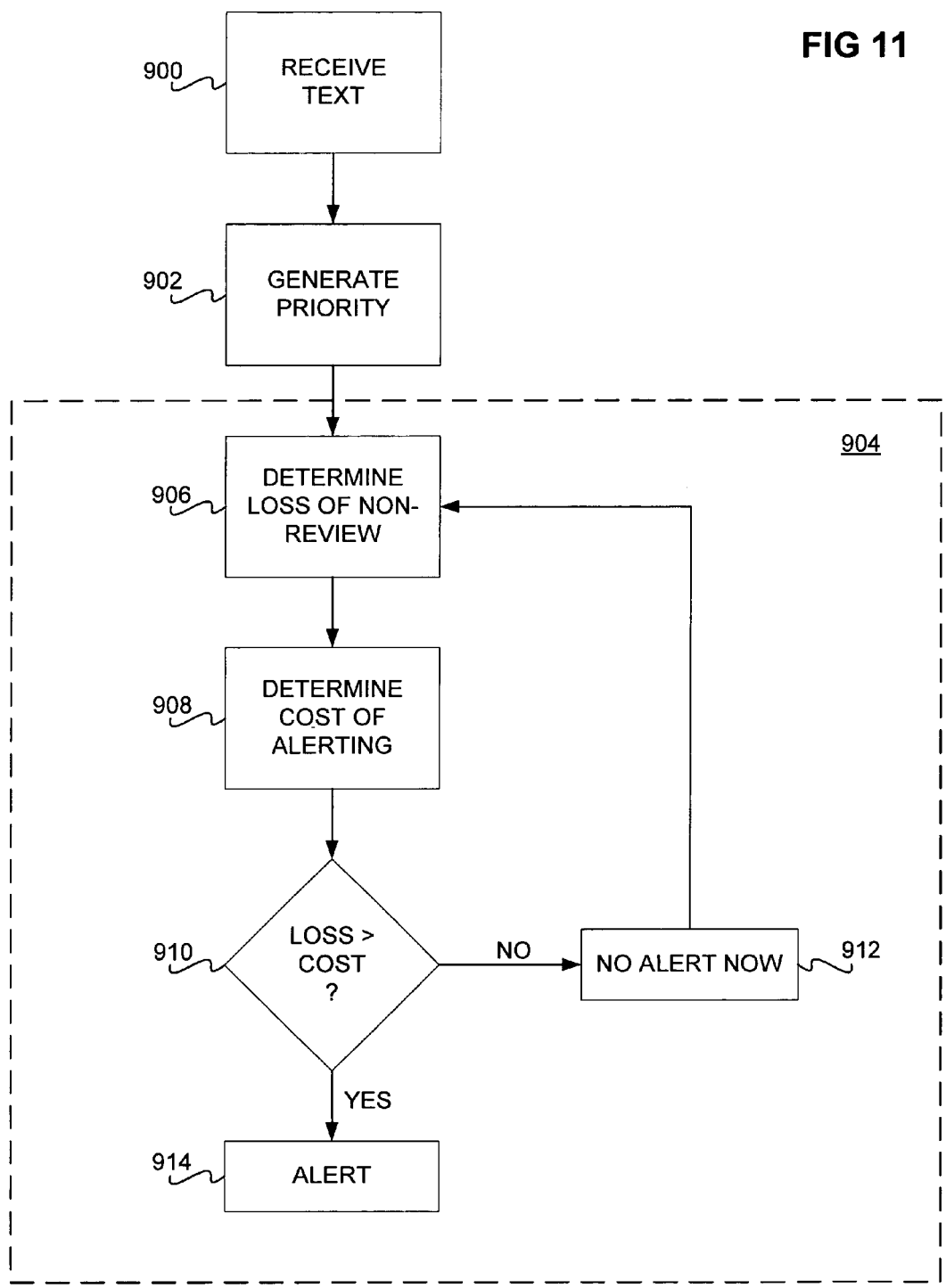
FIG. 11 is a flowchart of a method according to an embodiment of the invention; and, FIG. 12 is a diagram of a system according to an embodiment of the invention.

Referring to FIG. 11, a flowchart of a method according to an embodiment of the invention is shown. In 900, a document to have a priority thereof assigned is received. The document can be an email message, or any other type of document; the invention is not so limited. In 902, the priority of the document is generated, based on a document classifier, as has been described. Thus, in one embodiment, 902 includes initially training and continually training the document classifier, as has been described.

In one embodiment, the output of the alert is performed as is now described. The user is alerted based on a predetermined criteria. The predetermined criteria that can be used in conjunction with embodiments of the invention is not limited by the invention; however, in one embodiment, the predetermined criteria is as described in a further section of the detailed description.

In one embodiment, a sound is played to alert the user to a prioritized document. In other embodiments, an agent or automated assistant is opened—that is, the agent appears on the screen, to notify the user of the prioritized document. In another embodiment, the prioritized document is opened—that is, the document is displayed on the screen. The document can receive focus—that is, the window in which the document is displayed is selected as the active window, as opposed to the window the user was previously working in. This can also include sizing the document based on its priority, such that the higher the priority of the document, the larger the window in which it is displayed, and/or centrally locating the document based on its priority—for example, moving the document closer to the screen as a function of the priority of the document.

Figure 12:
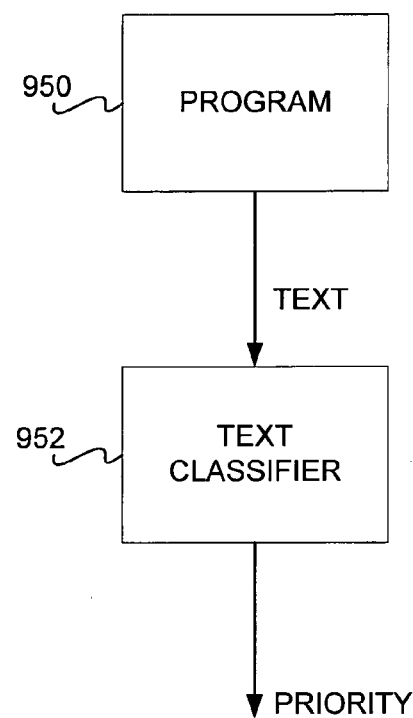

Referring next to FIG. 12, a diagram of a system according to an embodiment of the invention is shown. The system includes a program 950 and a document classifier 952. Each of the program 950 and the classifier 952 include a computer program executed by a processor of a computer from a computer-readable medium thereof, in one embodiment. However, the invention is not so limited.

The program 950 generates a document for input into the document classifier 952. In one embodiment, the program includes an electronic mail program that receives email, which then serves as the document. The document classifier 952, based on the document, generates a priority thereof, as has been described. In one embodiment, the document classifier 952 is a Bayesian document classifier, while in another embodiment, it is a Support Vector Machine classifier. The priority of the document output by the document classifier 952 can then be used in further conjunction with a cost-benefit analysis, as has been described, to effectuate further output and/or alerting based thereon, as has been described. The invention is not so limited, however.

Figure 13:
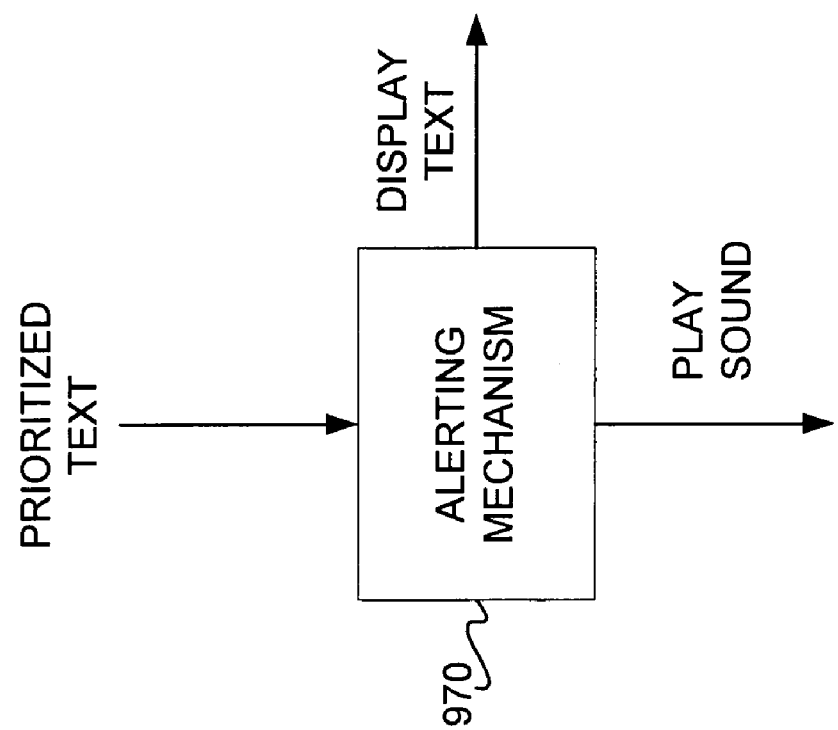
FIG. 13 is a diagram of a system according to another embodiment of the invention; and, FIG. 14 is a diagram of a user interface via which predetermined criteria for alerting can be modified, according to an embodiment of the invention.

Referring next to FIG. 13, a diagram of a system according to another embodiment of the invention is shown. The system of FIG. 13 includes an additional component, an alerting mechanism 970. Not shown in FIG. 13 are the program 950 and the document classifier 952; however, the alerting mechanism 970 is operatively and/or communicatively coupled to the latter. In one embodiment, the mechanism 970 includes a computer program executed by a processor of a computer from a computer-readable medium thereof, but the invention is not so limited. The alerting mechanism 970, as shown in FIG. 13, receives a prioritized document, and based on a predetermined criteria, is able to display the document, or play a sound, as has been described. In one embodiment, all of the documents (e.g., messages) that have been received, and that have a priority greater than a predetermined threshold, are displayed as a list. It is noted that the invention is not limited as to a particular predetermined criteria, although in one embodiment, the criteria is as described in the next section of the detailed description.

The system, as well as other embodiments of the invention, can include other functionality as well. For example, a special priorities-oriented viewer can be provided that acts like a special view onto one's email store, in terms of its ability to filter by priority. The special viewer can allow for summaries of messages—e.g., the sender, title, and optionally a brief snippet of the message—to be sorted in a list by priority score. The viewer can also allow a user to sort and view only those messages that remain unread as an option. The special viewer can also allow users to scope the sorting of messages by priority within some scoped time period, and to change the scope or periods of time being considered. For example, a user can specify that the viewer only display email from today; or, the user can specify that the list span two days, one week, all the messages in the in-box, etc. The viewer can also let the user prune from the display messages below a user-specified minimal threshold.

Furthermore, beyond the use of qualitatively different sounds for low, medium, and high priorities, one or more scalar parameters can be used that defined the manner by which an alerting sound is rendered. The parameters can be made functions of the inferred priority. Such parameters include variables that dictate something as simple as the volume of the alerting sound, for example, to continuous changes in the modulation, resonance, etc., of the sound.

Other functionality includes a simple form can be provided to users to define thresholds among different ranges of uncertainty, and they can specify multiple options involving the automation of the sizing and centering of messages within each range. A "While Away" briefer can be included to give the user a summary of messages that have arrived while a user was away or busy with another application. The system can be instructed to bring up a summary of email directed by priority values when a user returns after being away, or comes back to the special viewer after working with the system in a quiet mode. The automated text summarizer can be controlled to decrease continuously the summarization level of the text of messages as a function of the priority of the document—that is, as documents increase in priority, they are less and less summarized in the summarized view. The priorities can also be used to color or add special annotations, such as priority flags, icons indicating level of priority, a special priority field itself, etc., to email headers appearing in the display.

Furthermore, a user-defined threshold can be used on the priority assigned to messages to set up a temporary interaction context that is active for some portion of time following an alert or summary that a message has arrived exceeding the threshold. Following an alert, and lasting for the time period that an interaction context is active, predetermined gestures are allowed to give the user access to more details about the message that was associated with the alert. Such gestures include a simple wiggle of the mouse from side to side, for example. As an example, an audio alert may indicating that an incoming message has exceeded some threshold of criticality. The user can then wiggle the mouse quickly from side to side to see details about the message that led to the alert. The amount of time that such an interaction context is active can be made a function of the priority of the message, or can be user-defined.

Predetermined Criteria for Alerting

In this section of the detailed description, a predetermined criteria for alerting according to one embodiment of the invention is described. The routing criteria is the criteria that governs when and how a user is alerted to a prioritized document, for example, by having the document displayed, or a sound played to indicate the arrival of the document. The criteria is described with reference to FIG. 14, which is a diagram of a user interface via which criteria options can be modified, according to one embodiment of the invention.

Referring to FIG. 14, the manner by which the user is alerted to a prioritized document depends on whether the document is classified as low, medium or high priority. That is, depending on whether the document is classified as low, medium or high priority, the alerting of the document is governed by the options selected in regions 990, 992 and 994, respectively. In one embodiment, the thresholds between a low and a medium priority document, and between a medium and a high priority document are user defined. Thus, a user indicates the threshold between low and medium in box 996, and the threshold between medium and high in box 998. In other words, the user is alerting based on the priority being within a predetermined priority range. Alternatively, if the user selects check box 991, the thresholds are set in a context-sensitive manner, by decision-theoretic reasoning.

Each region 990, 992 and 994 has four options regarding the alerting of a prioritized document. First, the user may indicate that a sound is played when a document has a priority falling into a given region. Second, the user may indicate that a summary of the message and its priority receives focus, which means that a summary view is displayed listing the inferred priority of the message, and information summarizing the content and nature of the message, including such information as the subject and sender of the message. This summary view may be temporarily selected as the active task on the screen (for example, in a window displaying a list of documents, this window will have focus), as opposed to the task currently being worked on by the user. Third, the user may indicate that the document be automatically opened in a window on the screen. Fourth, the user may indicate that an agent or automated assistant with speech recognition and text-to-speech rendering abilities be activated, to alert the user to the priority and to allow the user to engage further in a dialog about hearing or seeing more about the message.

Other alerting options include those selected by checking boxes 993, 995 or 997. Checking box 993 indicates that if the user is busy, then alerts are deferred until the user is no longer busy, unless the priority of the document is at least a predetermined threshold. As shown in FIG. 14, this threshold is 75. Thus, it is first determined whether the user is busy and whether the priority of the document is greater than 75; if both of these conditions are true, then the user is alerted. Checking box 995 indicates that the window in which the document is being displayed is sized according to its priority, while checking box 997 indicates that the window in which the document is being displayed is moved towards the center of the screen according to its priority.

CONCLUSION

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer-implemented method comprising:
  receiving a document;
  generating a priority of the document based on a trained document classifier;
  determining whether a user is busy; and
  alerting the user to the document based on a predetermined criteria.

2. The method of claim 1, wherein receiving a document comprises receiving an e-mail.

3. The method of claim 1, wherein alerting the user comprises playing a sound based on the predetermined criteria.

4. The method of claim 1, wherein alerting the user comprises opening the document based on the predetermined criteria.

5. The method of claim 4, wherein opening the document based on the predetermined criteria comprises sizing the document based on the priority of the document.

6. The method of claim 4, wherein opening the document based on the predetermined criteria comprises centrally locating the document based on the priority of the document.

7. The method of claim 1, wherein alerting the user comprises giving the document focus based on the predetermined criteria.

8. The method of claim 1, wherein alerting the user comprises opening an agent based on the predetermined criteria.

9. The method of claim 1, wherein alerting the user comprises alerting the user based on the priority being within a predetermined range.

10. The method of claim 1, wherein alerting the user comprises:
   determining whether the priority of the document is greater than a predetermined threshold; and
   upon determining that the user is busy, alerting the user only upon determining that the priority of the document is greater than the predetermined threshold.

11. The method of claim 1, wherein alerting the user comprises displaying a plurality of documents including the document in order according to a priority of each document.

12. The method of claim 11, wherein displaying the plurality of documents comprises displaying only documents having a priority greater than a predetermined threshold.

13. A computer-implemented method comprising:
   training a document classifier comprising of a Bayesian classifier and a support vector machine classifier;
   receiving a document comprising an e-mail;
   generating a priority of the document based on the document classifier;
   determining whether a user is busy; and
   alerting the user to the document based on a predetermined criteria.

14. The method of claim 13, wherein ale the user comprises at least one of playing a sound and opening the document based on the predetermined criteria.

15. The method of claim 13, wherein alerting the user comprises opening an agent based on the predetermined criteria.

16. The method of claim 13, wherein alerting the user comprises alerting the user based on the priority being within a predetermined priority range.

17. The method of claim 13, wherein alerting the user, comprises:
   determining whether the priority of the document is greater than a predetermined threshold; and,
   upon determining that the user if busy, alerting the user only upon determining that the priority of the document is greater than the predetermined threshold.

18. The method of claim 13, wherein alerting the user comprises displaying a plurality of documents including the document in order according to a priority of each document.

19. A machine-readable medium having instructions stored thereon for execution by a processor to perform a method comprising:
   receiving a document;
   generating a priority of the document based on a trained document classifier;
   determining whether a user is busy; and
   alerting the user to the document based on a predetermined criteria.

20. The medium of claim 19, wherein receiving a document comprises receiving an e-mail.

21. The medium of claim 19, wherein alerting the user comprises at least one of playing a sound and opening the document based on the predetermined criteria.

22. The medium of claim 19, wherein alerting the user comprises opening an agent based on the predetermined criteria.

23. The medium of claim 19, wherein alerting the user comprises alerting the user based on the priority being within a predetermined priority range.

24. The medium of claim 19, wherein alerting the user comprises:
   determining whether the priority of the document is greater than a predetermined threshold; and
   upon determining that the user if busy, alerting the user only upon determining that the priority of the document is greater than the predetermined threshold.

25. The medium of claim 19, wherein alerting the user comprises displaying a plurality of documents including the document in order according to a priority of each document.

26. A computerized system, comprising:
   a program to generate a document;
   a trained document classifier to generate a priority of the document;
   a component to determine whether a user is busy; and
   an alerting mechanism to alert the user of the document based on a predetermined criteria.

27. The system of claim 26, further comprising a viewer to filter documents including the document by the priority thereof.

28. The system of claim 26, wherein the alerting mechanism employs at least one scalar parameter to define the manner by which an alerting sound is rendered, based on the priority of the document.

29. The system of claim 26, wherein the user is able to define thresholds among different ranges of uncertainty, and specify multiple options involving the automation of sizing and centering of documents including the document within each range.

30. The system of claim 26, further comprising a brief to provide the user a summary of documents including the documents, that have arrived while the user was one of away or busy within another application.

31. The system of claim 30, wherein the summary of the document has a summarization level, such that the summarization level decreases as a function of the priority of the document.

32. The system of claim 26, further comprising an interaction context that is active for a period of time following an alert that the document priority has exceeded a threshold.

33. The system of claim 32, wherein the user is able to make a gesture while the interaction context is active to view the document.

34. The system of claim 26, wherein the program comprises an electronic mail program to receive an electronic mail as the document.

35. The system of claim 26, wherein the document classifier comprises a Bayesian document classifier.

36. The system of claim 26, wherein the document classifier comprises a support vector-machine classifier.

37. The system of claim 26, wherein the alerting mechanism comprises a sound-playing mechanism.

38. The system of claim 26, wherein the alerting mechanism comprises a document-displaying mechanism.

39. The system of claim 38, wherein the document-displaying mechanism is to display the document centrally based on the priority of the document.

40. The system of claim 38, wherein the document-displaying mechanism is to size the document based on the priority of the document.

41. The system of claim 26, wherein the predetermined criteria comprises a determination of whether the priority of the document is within the predetermined range.

42. The system of claim 26, wherein the predetermined criteria comprises a determination of whether the user is busy.

43. The system of claim 26, wherein at least one of the alerting mechanism, the program and the document classifier comprise a computer program executed by a processor from a computer-readable medium.

* * * * *